Dec. 20, 1955     I. MEOHAS     2,727,305
KITCHEN IMPLEMENT
Filed Dec. 26, 1951
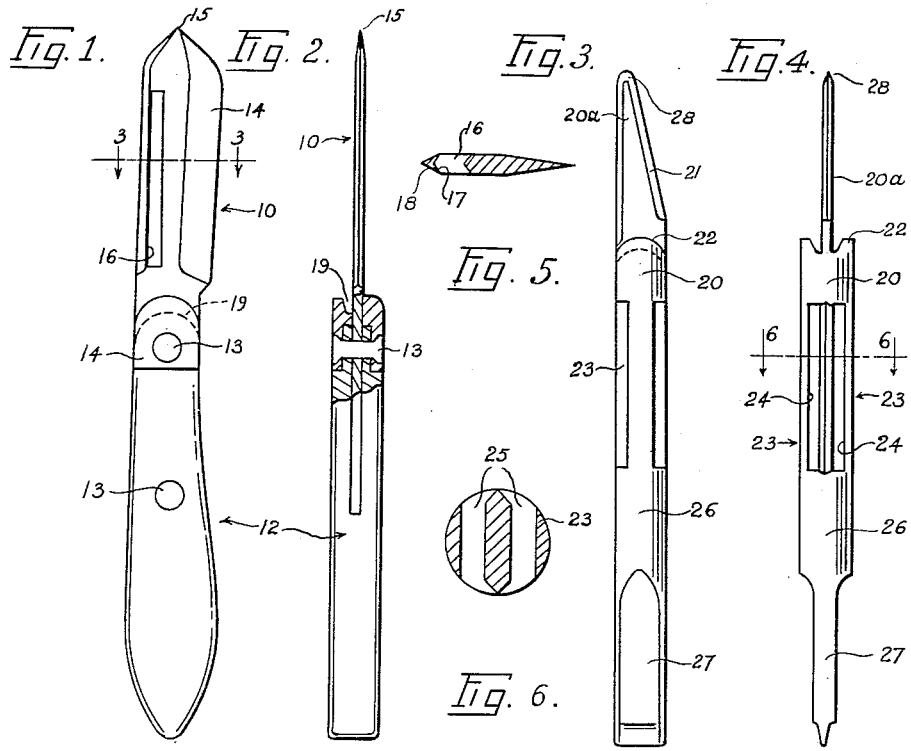
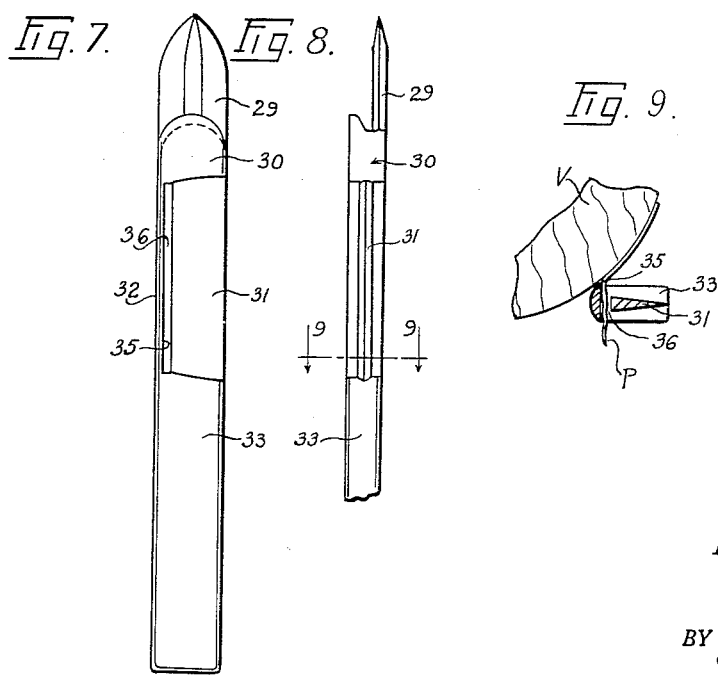
ISAAC MEOHAS
INVENTOR.
BY Fulwider and Mattingly
ATTORNEYS.

United States Patent Office 2,727,305
Patented Dec. 20, 1955

2,727,305

KITCHEN IMPLEMENT

Isaac Meohas, Long Beach, Calif.

Application December 26, 1951, Serial No. 263,141

1 Claim. (Cl. 30—279)

My invention relates to implements used in kitchen work, and particularly to implements used for cutting and peeling articles of food, and for opening cans in the kitchen or pantries of homes, restaurants and other eating places.

It is known in the art to provide separate implements for each of the above mentioned operations. Thus, knives for cutting, as well as for peeling potatoes, tomatoes and various fruits and vegetables are old. Can openers, of course, are also old in the art. The can openers, however, cannot be used for cutting purposes, nor may the knives be used to open cans. Hence, an assortment of such specialized implements has to be kept in the kitchen or pantry. This arrangement has the drawback that considerable time may be required to find both a knife and also a can opener. A further disadvantage is that the time spend in cleaning, sharpening, drying and putting the kitchen implements away is increased.

It is the general object of my invention to provide a multi-purpose kitchen implement which may be used for a variety of commonly required operations in the kitchen or pantry.

A particular object of the invention is to provide a kitchen implement which is simple to use and with which a variety of hand operations may be carried out without changing any parts.

A further object of the invention is to provide a multi-purpose kitchen implement which combines a kitchen knife, can opener and preferably also a peeling cutter distinct from the kitchen knife element, the different elements being so arranged that the user can work with the implement with ease and rapidity.

Still further objects and features of my invention will hereinafter appear from the following specification read with reference to the drawings which illustrate preferred embodiments of the multi-purpose tool constructed according to my invention.

In the accompanying drawings:

Figure 1 is a side elevation of one form of the kitchen implement of my invention;

Figure 2 is a front view of the implement shown in Figure 1 with a portion of the handle shown in section;

Figure 3 is a cross section, drawn on an enlarged scale, on the line 3—3 of Figure 1;

Figure 4 is a side elevation of a modified form of the kitchen implement;

Figure 5 is a front elevation of the implement shown in Figure 4;

Figure 6 is a cross section on the line 6—6 in Figure 5, drawn on an enlarged scale;

Figure 7 is a front elevation of a further modified embodiment of my invention;

Figure 8 is a side elevation of the implement shown in Figure 7; and,

Figure 9 is a cross section on the line 9—9 in Figure 8, and showing a peeling cutter provided on the implement in use.

Referring now to Figure 1 of the drawings, the numeral 10 indicates the blade portion of the kitchen implement secured in a handle 12 of wood or plastic by countersunk rivets 13. Preferably the upper end of the handle is provided with a metal cap 14 interfitted with the upper end of the handle and secured thereto by the upper rivet 13.

The blade portion 10 is rather short and thick, one edge 14 being ground to a sharp cutting edge. The end of the blade is tapered to a point 15. A peeling cutter is provided close to the opposite edge of the blade by forming a slot 16, the slot being machined so as to provide a sharpened edge 17 (Figure 3) by making the wall of the slot toward the edge of the knife slope inwardly from its edge, and by backing off the edge of the blade as shown at 18. The described construction of the peeling edge enables the peeling cutter to be used on either edge, but the peeling cutter may be formed in other ways, as for instance, by pressing out a longitudinal ridge parallel to the back of the blade blank while it is in soft condition, and then grinding a cutting edge along the ridge by removing most of the metal projecting above the plane of the blade.

The shoulder of the handle at the blade end is formed to provide a fulcrum enabling the implement to be used for cutting open sealed-can tops. As shown in Figure 1, a shoulder of cap 14 is provided with a groove 19 sufficiently deep to securely engage over the usual raised rim around a can top. Preferably the groove 19 is arcuate in order to afford a smoothly rolling engagement of the shoulder with the edge of the can top being opened.

Obviously both shoulders of cap 14 may be formed as described, or if the handle is made from a sufficiently tough material, the cap 14 may be dispensed with, and the grooves 19 made in the shoulders of the handle.

The modified form of the implement shown in Figures 4, 5 and 6 is of unitary construction being formed of a round steel rod 20 to provide a blade 20a with a cutting edge 21, a grooved shoulder 22 for use when using the implement as a can opener, peeling cutters 23 provided by the edges 24 of slots 25, in the handle portion 26 of round rod, and a flattened end portion 27 of the handle which may be used to pry out can tops of the closely fitting pressed-in variety in wide use for spices and the like.

It will be noted that in the modified form of the invention shown in Figures 4 and 5 the cutting blade is shorter, narrower, and may be thinner than the cutting blade of the form shown in Figures 1 and 2. The blade is preferably sloped from one side to a point 28 substantially aligned with the opposite side of the handle portion.

The modified form of the implement shown in Figures 7, 8 and 9 differs from those previously described in having a can opener blade 29 and fulcrum shoulder 30 arranged at one end of the implement, while a kitchen knife 31 and peeling cutter 32 are formed below the can opener elements. The implement is formed from a rectangular bar 33, the can opener blade 29 being preferably aligned with one side of the bar as shown in Figure 8 in order to afford space for the arcuate shoulder 30 which is formed with an arcuate groove 34.

The kitchen knife 31 is sufficiently rigid to transmit adequate force to the can opener elements when in use although it is considerably narrower than the rectangular bar. The peeling cutter is provided by a cutting edge 35 extending along one edge of longitudinal slot 36 between the back of the knife blade and the back of the bar, which is sufficiently rounded to provide a sharp edge at 35 as shown in Figure 9.

It will be noted that in all embodiments of my invention the cutting blade is sufficiently rigid to transmit the force necessary to puncture the lid of a can and cut around the edge thereof when being used as a can opener, the thickness of blade necessary enabling a peeling cutter to be provided behind the cutting edge. The peeling cutter of the embodiment illustrated in Figures 7, 8 and 9 is shown in use in Figure 9 to peel a vegetable indicated at V, a strip of peel P being shown passing through the slot 36.

The implement may, of course, be produced with or without the peeling cutter as may be desired, but is preferably produced in the forms illustrated in the drawings because of its greater usefulness.

While I have particularly described and illustrated embodiments of my invention at present considered preferable by me, it is to be understood that various changes and modifications may be made therein by those skilled in the art without departing from the scope of the invention as defined by the appended claim.

I claim:

A multi-purpose kitchen implement, comprising: an elongated member defined by longitudinally extending primary cutting edge and an opposite laterally separated blunt edge, said member being formed with a longitudinally extending slot adjacent to and parallel with said blunt edge, the sides of said slot proximate to said blunt edge being curved concavely away from said blunt edge and the opposite side of said slot being curved convexly toward said blunt edge, said member having its maximum cross-sectional thickness in the vicinity of said slot and tapering gradually from such point of maximum thickness toward said primary cutting edge whereby said member may serve as a conventional knife blade when moved in a direction substantially normal to said primary cutting edge, and said curved concave side of said slot cooperating with the portion of said member adjacent said blunt edge to define two laterally spaced secondary cutting edges that may be used for paring purposes.

References Cited in the file of this patent

UNITED STATES PATENTS

| | | |
|---|---|---|
| 1,133,213 | Arita | Mar. 23, 1915 |
| 1,327,134 | Blake | Jan. 6, 1920 |
| 1,331,880 | Smith | Feb. 24, 1920 |
| 1,608,482 | Cox | Nov. 23, 1926 |
| 1,746,116 | Hult | Feb. 4, 1930 |
| 2,321,289 | Gamache | June 8, 1943 |
| 2,570,002 | McMillen | Oct. 2, 1951 |